(12) United States Patent
Kromm et al.

(10) Patent No.: US 11,479,155 B1
(45) Date of Patent: Oct. 25, 2022

(54) SEAT BACK TRIM RETAINER

(71) Applicant: FAURECIA AUTOMOTIVE SEATING, LLC, Auburn Hills, MI (US)

(72) Inventors: Dorothy Kromm, Lake Orion, MI (US); Igor Fudym, Farmington Hills, MI (US)

(73) Assignee: FAURECIA AUTOMOTIVE SEATING, LLC, Auburn Hills, MI (US)

( * ) Notice: Subject to any disclaimer, the term of this patent is extended or adjusted under 35 U.S.C. 154(b) by 0 days.

(21) Appl. No.: 17/231,902

(22) Filed: Apr. 15, 2021

(51) Int. Cl.
  *A47C 31/00* (2006.01)
  *B60N 2/58* (2006.01)
(52) U.S. Cl.
  CPC .................................. *B60N 2/5825* (2013.01)
(58) Field of Classification Search
  CPC .............................. B60N 2/5825; B60N 2/5841
  See application file for complete search history.

(56) References Cited

U.S. PATENT DOCUMENTS

| | | | |
|---|---|---|---|
| 5,653,503 A | | 8/1997 | Taggart |
| 7,669,925 B2 * | | 3/2010 | Beck ..................... B60N 2/5825 |
| | | | 297/452.56 |
| 7,891,735 B2 | | 2/2011 | Oku |
| 9,067,519 B2 | | 6/2015 | Kajihara et al. |
| 2012/0274116 A1 * | | 11/2012 | Palmer ................. B60N 2/5841 |
| | | | 297/396 |
| 2017/0355291 A1 * | | 12/2017 | Line ........................ B60N 2/68 |

FOREIGN PATENT DOCUMENTS

| | | |
|---|---|---|
| EP | 1710111 B1 | 9/2008 |
| EP | 2729327 B1 | 6/2015 |
| WO | WO2013004960 A1 | 1/2013 |

* cited by examiner

*Primary Examiner* — Shin H Kim
(74) *Attorney, Agent, or Firm* — Reising Ethington P.C.

(57) ABSTRACT

A vehicle seat trim retainer that can be installed on a vehicle seat. The seat trim retainer includes a base retainer with a base retainer foundation and an inner flange. The base retainer foundation includes a stabilizing feature at one end and a base tip at an opposing end. The inner flange includes a C-shaped channel and a channel extender, with the channel extender including a channel flange.

20 Claims, 4 Drawing Sheets

SEAT BACK TRIM RETAINER

TECHNICAL FIELD

The present disclosure is related to trim retainers used inside vehicle seats to retain portions of a seat covering in place.

BACKGROUND

Vehicle trim covers such as upholstered coverings are common in vehicle interiors, such as on vehicle seats. Such seat trim covers are commonly attached to the vehicle seat using trim retainers. Typical trim retainer designs in use today involve multiple components and steps to attach the seat trim cover to the seat when completing a vehicle seat assembly.

In PCT Publication No. WO 2013/004960 A1 to Guenet et al., a device for attaching an upholstery cover of a motor vehicle seat is disclosed, in which the cover has an inverted V-shaped profile that interlocks with a V-shaped free end of an attachment part secured to the seat framework. The inverted V-shaped profile is made of plastic and is attached to the upholstery cover by gluing. This can complicate seat assembly.

SUMMARY

An illustrative vehicle seat includes a vehicle seat trim retainer on a vehicle seat comprising a base retainer. The base retainer includes a base retainer foundation and an inner flange, the base retainer foundation including a stabilizing feature at a first end and a base tip at a second end. The inner flange includes a C-shaped channel and a channel extender, in which the channel extender includes a channel flange.

In various embodiments, the base retainer further comprises a base upper arm that extends from the stabilizing feature.

In various embodiments, the base retainer further comprises a base lower arm that extends from the base tip.

In various embodiments, the base retainer further comprises a base finger.

In various embodiments, the base finger has greater thickness adjacent to the C-shaped channel than the base finger adjacent to the base tip.

In various embodiments, the space between the base upper arm and the C-shaped channel defines a panel-receiving space.

In various embodiments, the space between the C-shaped channel and the channel flange defines a flange-retaining space.

In various embodiments, the base tip comprises a base tip mating surface adjacent to the base tip.

In various embodiments, the inner flange is a different length with respect to the base retainer foundation.

In various embodiments, the inner flange is shorter in length with respect to the base retainer foundation.

In various embodiments, the seat trim retainer is a single extrusion made up of material selected from one of plastic, metal, or rubber.

In various embodiments, the panel-receiving space is configured to retain a seat back panel when the seat trim retainer is installed on the vehicle seat.

In various embodiments, the flange-retaining space is configured to receive a lip or a flange of a seat back panel when the seat trim retainer is installed on the vehicle seat.

In various embodiments, the base lower arm is joined with the base upper arm and the C-shaped channel at the base retainer foundation.

In various embodiments, the seat trim retainer is configured to be covered on the seat back or enclosed within the seat back when installed on the vehicle seat.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Described herein is a seat trim retainer that can be easily integrated into a vehicle seat for use in locations where it is desirable to have the seat covering drawn into a recessed area. One example use of this trim retainer is in seat backs where the upper part of the seat at or near the headrest has a cushioned portion that protrudes rearwardly towards second or third row seating of the vehicle. In such designs it is often desirable to have the seat covering recessed into the seat back below the protruding cushioned portion so as to help maximize area for the passenger behind the seat, including for example additional knee clearance and space for a seat pocket in the seat back.

As described below, the disclosed trim retainer may be implemented as a single, unitary component (e.g., a single extrusion) that is located on the B side (inner side) of the seat covering. The trim retainer connects the seat covering to a seat frame in a manner that pulls and retains the seat covering into a recessed area of the seat back. As will be described below, the trim retainer advantageously allows for simple installation onto a cross member of the seat frame and for easy recessing of the seat covering by snapping a distal portion of the trim retainer over a second seat frame member.

Figure 1:
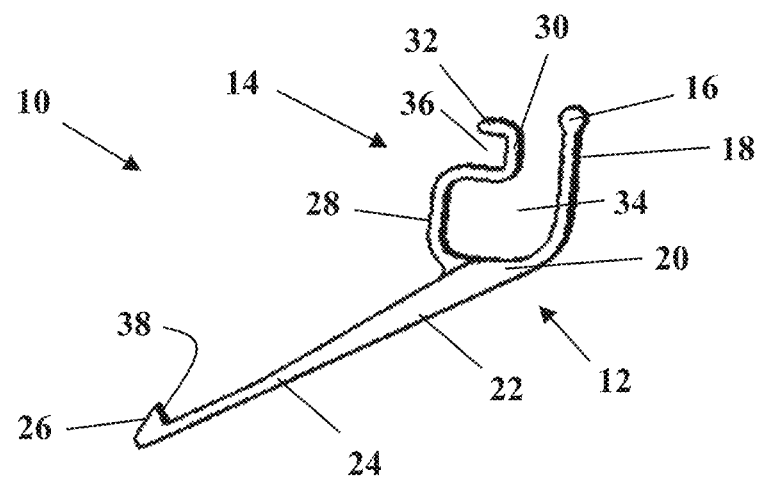
FIG. 1 is a side view of one embodiment of a trim retainer.

FIG. 1 shows a side, or end, view of one embodiment of a seat back trim retainer 10. Preferably, one seat back trim retainer 10 can be installed for each free-standing vehicle seat within the vehicle cabin. For example, the rear seat in a sedan may not be considered "free-standing" if the back of the seat is not exposed to the vehicle cabin. Conversely, a third-row sport utility vehicle (SUV) may have a one such seat back trim retainer 10 for each seat since each seat back is typically exposed. The trim retainer 10 is used to connect different cover or trim portions of the seat such that it is properly covered and safe for use. Internal components, including the seat back trim retainer 10, are covered or otherwise enclosed by a seat back panel.

FIG. 1 shows the seat back trim retainer 10 including a base retainer 12 and an inner flange 14. A base retainer foundation 20 connects the base retainer 12 to the inner flange 14. A base upper arm 18 extends from the base retainer foundation 20. The stabilization bead 16 extends from the base upper arm 18 and allows the seat back trim retainer 10 to be more stable when installed on a seat frame assembly of a vehicle seat. A base lower arm 22 is located under the base retainer foundation 20 and extends at a predetermined angle from the base retainer foundation 20. The base lower arm 22 is preferably thicker than a base finger 24. Base finger 24 is farther away from the base retainer foundation 20 with respect to base lower arm 22. The base finger 24 may be biased against a seat back panel in the installed position. At the opposite end of the base finger 24 with respect to the base lower arm 22, a base tip 26 and base tip mating surface 38 are formed. The base tip 26 forms a nub or other structural shape that is complimentary for the base tip mating surface 38 to be effective when in the installed position on the vehicle seat frame assembly.

The trim retainer 10 comprises a retainer body 12 which may be formed by molding or extrusion as a unitary component. As used herein, "unitary" means that the material of which the component is made extends continuously throughout the component, rather than the component being made of two or more separate parts that are united together by adhesive, welding, or otherwise. In other embodiments, the retainer body 12 may be formed by multiple components joined together.

Figure 2:
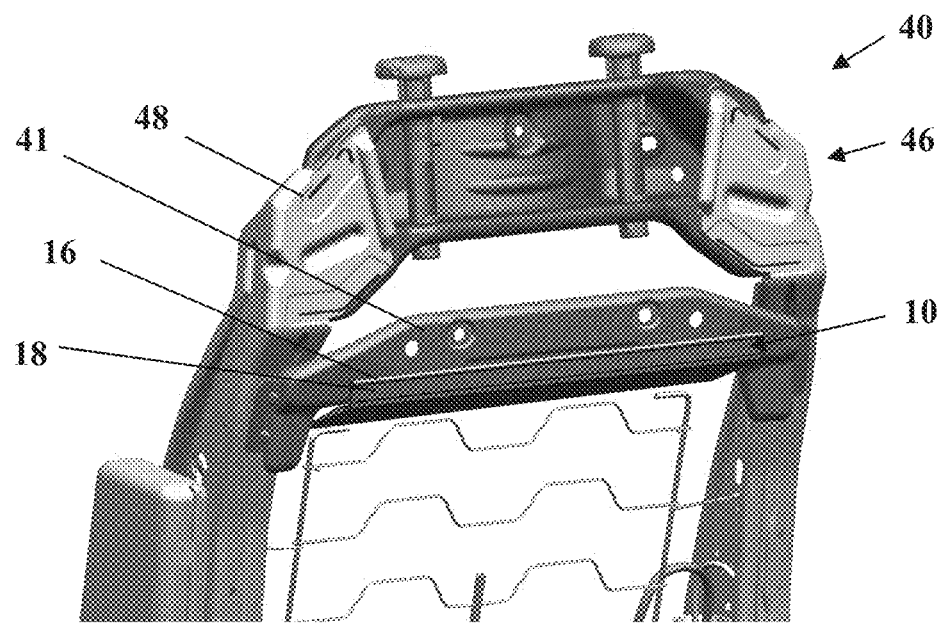
FIG. 2 is a left rear perspective view of an upper portion of a vehicle seat frame assembly with the trim retainer of FIG. 1 shown in the installed position.
Figure 3:
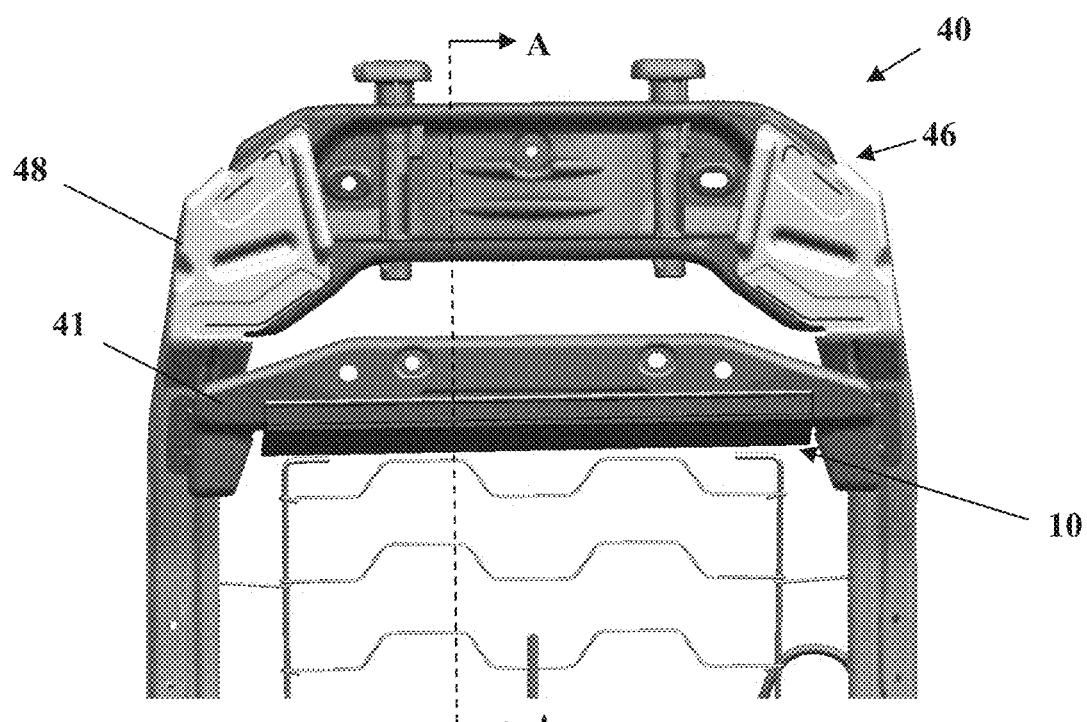
FIG. 3 is a rear view of the upper portion of the seat frame assembly of FIG. 2.

FIGS. 2 and 3 show the various structural components and overall assembly of an upper portion 48 of vehicle seat frame assembly 46 of a vehicle seat 40. The vehicle seat 40 includes the seat back trim retainer 10 with the base upper arm 18 retaining a seat cross-member panel 41 within the panel-receiving space 34. The shape of the panel as-built on the seat cross-member 41 and the panel-receiving space are complementary in order to achieve a secure fit between the cross-member and the seat back trim retainer 10 at the panel-receiving space 34. In other words, the sizes and shapes of the cross-member panel 41 and the panel-receiving space 34 may be adjusted to be suitable for a specific vehicle seat design. Further referring to FIG. 2, a seat back panel may partially or completely cover the seat back trim retainer 10 and its corresponding seat back structure. The seat back panel is installed on the seat back structure, on the trim, on the covering, or installed on any combination thereof. Creating this structure allows for a secure seat back assembly with high perceived quality. Each panel may itself may include multiple panels, or certain panels may be omitted. It should also be noted that the figures are not necessarily to scale. For example, certain panel thicknesses or features may be exaggerated for purposes of illustration.

Figure 6:
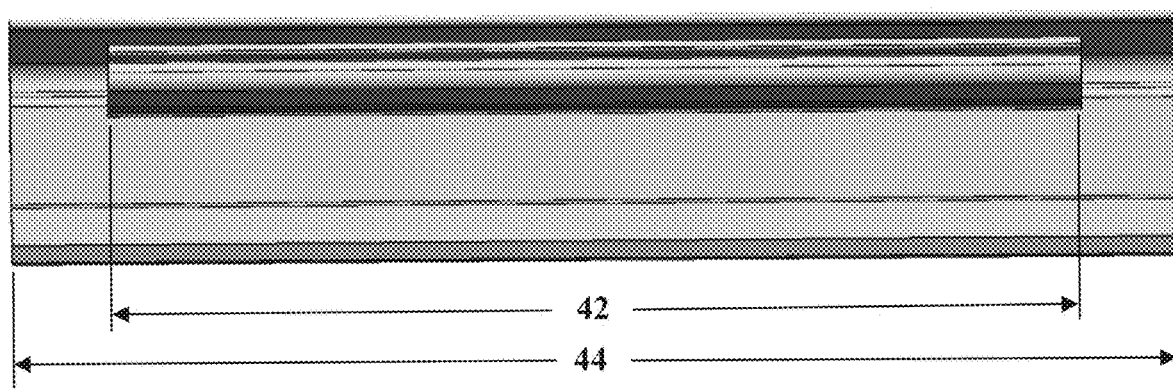
FIG. 6 is a partial rear view of upper portion of the seat frame assembly as in FIG. 3, showing only the trim retainer in isolation.
Figure 7:
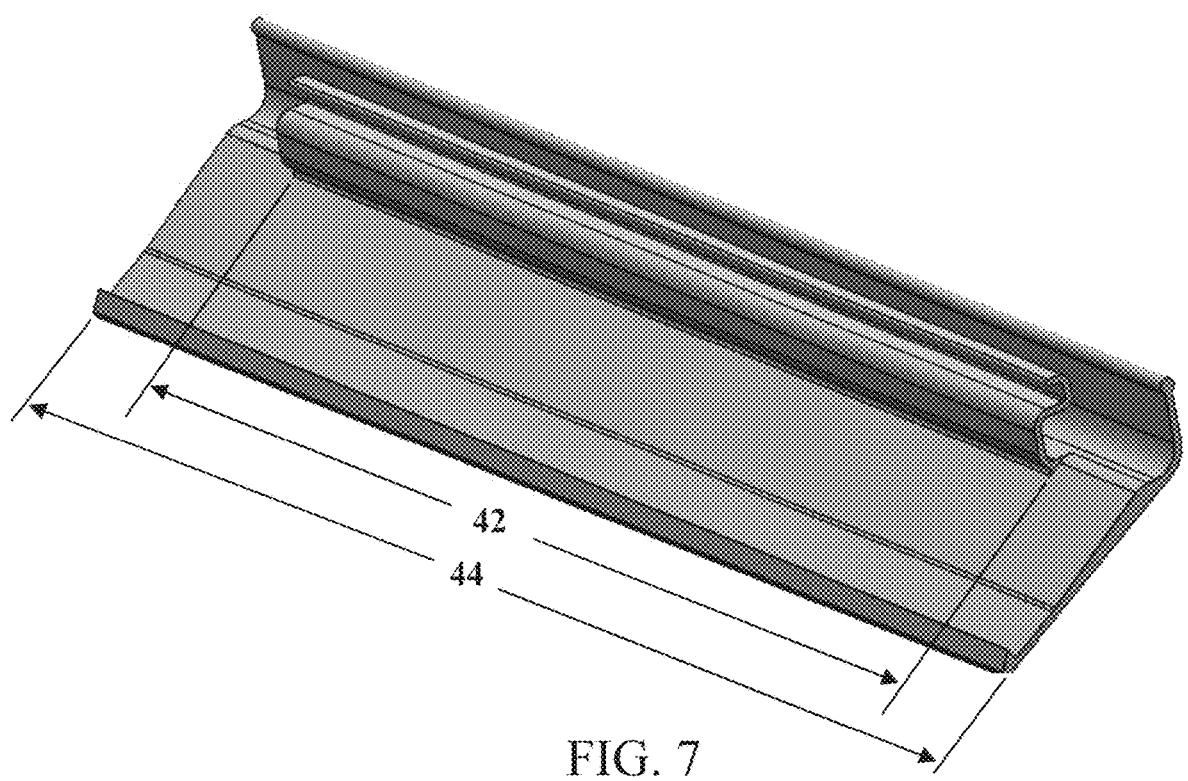
FIG. 7 is a left front perspective view of the trim retainer extension of FIG. 6 shown in isolation.

In at least some embodiments, the seat back trim retainer 10 is structured to promote modularity. For example, the same part may be used on a specific seat back design but may be installed properly on a different seat with the same connection points for the seat back trim retainer 10. Also, as shown in FIGS. 6 and 7, in at least some embodiments, the rear side of the vehicle seat 40 may include the seat back trim retainer 10 with a base foundation length 44 that is longer than the inner flange length 42. The seat cross-member will preferably have indentation(s) or one or more other features to accommodate the size and shape inner flange 14 at the inner flange length 42. This serves to minimize the footprint of the seat back trim retainer 10 and to conserve material required to keep the cover and trim materials in place. The seat back trim retainer 10 may be nested onto the seat cross-member using a variety of attachment methods. These attachments may include but are not limited to pins, rivets, nuts, bolts, screws, hook-and-loop connections, adhesives, or other suitable attachments. The method of connection may include use of a rotary tool, gluing, welding, or otherwise performing suitable action to attach the seat back trim retainer 10 to the seat cross-member. The cover and trim connections to the seat back trim retainer 10 are preferably via the panel-receiving space 34, the flange-retaining space 36, and the base tip mating surface 38. However, other seat cross-member, trim, and cover configurations are possible.

Figure 4:
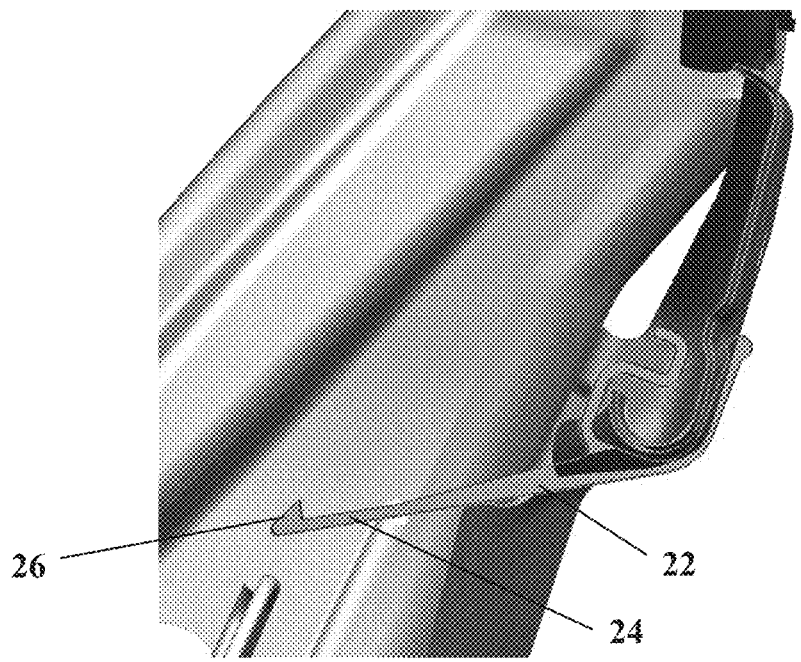
FIG. 4 is a section cut view along A-A of FIG. 3, which includes a seat cross-member panel inserted in part of the trim retainer.

FIG. 4 is a left side perspective view of the seat back trim retainer 10 from FIGS. 1-3 installed on the vehicle seat 40. The C-shaped channel 28 is installed on the vehicle seat 40 such that movement of the seat back trim retainer 10 is limited when installed on the vehicle seat 40. The flange retaining space 36 is used, preferably in a friction fit connection, with a lip or panel of the vehicle seat back that is different from the seat panel received in panel-receiving space 34 at an opposite end, as shown in FIG. 4. The channel extender 30 allows for additional surface area grip via channel flange 32, if desired. The flange retaining space 36, panel-receiving space 34, C-shaped channel 28, and base tip mating surface 38 preferably cooperate with one another to retain the trim and cover material of vehicle seat 40 while also keeping the seat back trim retainer 10 mounted to the vehicle seat 40. As a non-limiting example, the base tip 26 and consequently the base tip mating surface 38 will apply a biasing force toward the seat trim cover to hold it in place against the seat back frame of the seat 40.

Figure 5:
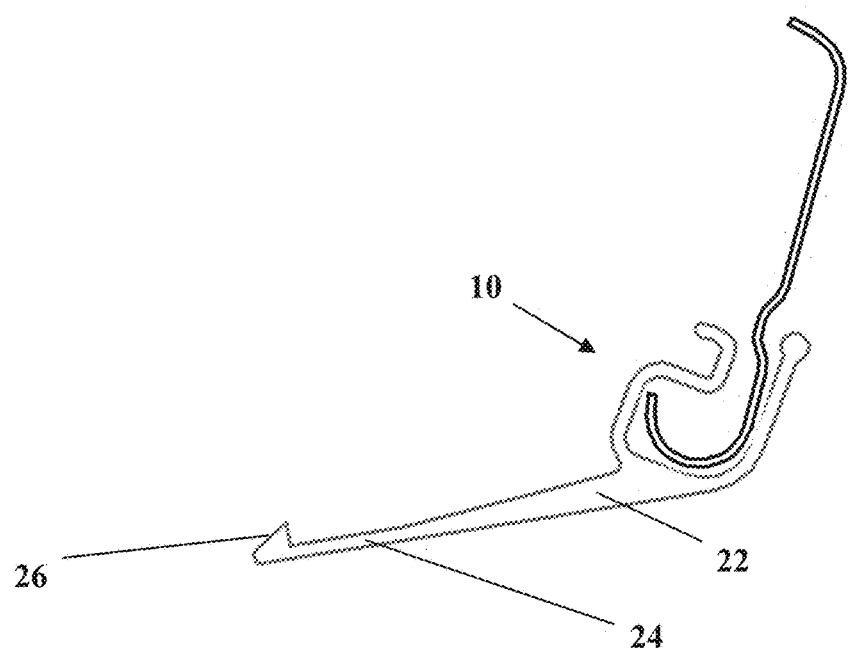
FIG. 5 is a section view as in FIG. 4 of the trim retainer and cross-member panel.

FIG. 5 illustrates the seat back trim retainer 10 from FIGS. 1-4 installed on the vehicle seat 40 from a front perspective view with respect to the vehicle seat 40. The material may be extruded, additively manufactured or 3D-printed, or manufactured in any suitable manner. Preferably, the material is either metal or plastic but may include any type of environmentally friendly, minimally processed, or natural material. The location of the seat back trim retainer 10 is suitable for occupant seating at the front of the vehicle seat 40. In other words, the seat back trim retainer 10 will not interfere with comfort of the occupant in the seat or come loose when the occupant sits down or leaves the seat.

Figure 8:
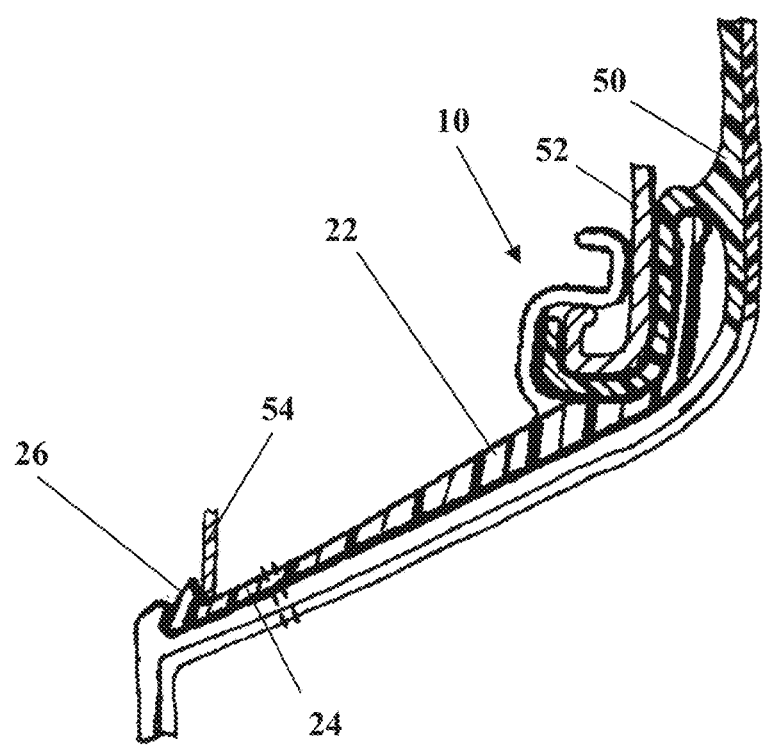
FIG. 8 is a side cross-sectional view of another embodiment of a trim retainer showing it connecting a seat covering to a seat frame.

FIG. 8 illustrates another embodiment of the seat back trim retainer 10 in a cross-sectional view. A seat covering 50 includes a substrate or panel with an overlying skin, or alternatively skin and foam. A first seat frame member 52 is horizontal, which is the foundation on which the other objects shown are mounted. The retainer may snap to or otherwise be configured to attach to a second seat frame member 54. Optional stitching 56 is included, which may be achieved by sewing or otherwise attaching the substrate or panel to the retainer 10 at the near the base tip 26 as shown.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle seat trim retainer for a vehicle seat, the vehicle seat trim retainer comprising:
   a base retainer with a base retainer foundation; and
   an inner flange,
   said base retainer comprising a stabilizing feature at a first end and a base tip at a second end;
   said inner flange comprising a C-shaped channel and a channel extender; and
   said channel extender comprising a channel flange,
   wherein the base retainer further comprises a base upper arm that extends from the stabilizing feature, and
   wherein a space between the base upper arm and said C-shaped channel defines a panel-receiving space.

2. The vehicle seat trim retainer of claim 1, wherein the base retainer further comprises a base lower arm that extends from the base tip.

3. The vehicle seat trim retainer of claim 2, wherein the base tip comprises a base tip mating surface.

4. The vehicle seat trim retainer of claim 1, wherein the base retainer further comprises a base finger.

5. The vehicle seat trim retainer of claim 4, wherein the base finger has greater thickness at an end nearest the C-shaped channel than at an end nearest the base tip.

6. The vehicle seat trim retainer of claim 1, wherein said panel-receiving space is configured to retain a seat back panel when the seat trim retainer is installed on said vehicle seat.

7. The vehicle seat trim retainer of claim 1, wherein a space between said C-shaped channel and said channel flange defines a flange-retaining space.

8. The vehicle seat trim retainer of claim 7, wherein said flange-retaining space is configured to receive a lip or a flange of a seat back panel when said seat trim retainer is installed on the vehicle seat.

9. The vehicle seat trim retainer of claim 1, wherein said inner flange has a different length than the base retainer foundation.

10. The vehicle seat trim retainer of claim 9, wherein said inner flange is shorter than the base retainer foundation.

11. The vehicle seat trim retainer of claim 1, wherein the base retainer and inner flange are made as a single extrusion.

12. The vehicle seat trim retainer of claim 1, further comprising a base lower arm joined with the base upper arm and the C-shaped channel at the base retainer foundation.

13. The vehicle seat trim retainer of claim 1, wherein said seat trim retainer is configured to be covered on a seat back of the vehicle seat or enclosed within the seat back when installed on the vehicle seat.

14. The vehicle seat trim retainer of claim 1, wherein the stabilizing feature is a stabilizing bead.

15. A vehicle seat trim retainer for a vehicle seat, the vehicle seat trim retainer comprising:
    a base retainer with a base retainer foundation; and
    an inner flange,
    said base retainer comprising a stabilizing feature at a first end and a base tip at a second end;
    said inner flange comprising a C-shaped channel and a channel extender; and
    said channel extender comprising a channel flange,
    wherein the base retainer further comprises a base finger, and
    wherein the base finger has greater thickness at an end nearest the C-shaped channel than at an end nearest the base tip.

16. The vehicle seat trim retainer of claim 15, further comprising a base lower arm joined with a base upper arm and the C-shaped channel at the base retainer foundation.

17. The vehicle seat trim retainer of claim 16, wherein a space between the base upper arm and said C-shaped channel defines a panel-receiving space.

18. A vehicle seat trim retainer for a vehicle seat, the vehicle seat trim retainer comprising:
    a base retainer with a base retainer foundation; and
    an inner flange,
    said base retainer comprising a stabilizing feature at a first end and a base tip at a second end;
    said inner flange comprising a C-shaped channel and a channel extender; and
    said channel extender comprising a channel flange,
    the trim retainer further comprising a base lower arm joined with a base upper arm and the C-shaped channel at the base retainer foundation.

19. The vehicle seat trim retainer of claim 18, wherein the base upper arm extends from the stabilizing feature.

20. The vehicle seat trim retainer of claim 18, wherein the base lower arm extends from the base tip.

* * * * *